Patented Apr. 10, 1923.

1,450,983

UNITED STATES PATENT OFFICE.

HOWARD W. MATHESON, OF MONTREAL, QUEBEC, CANADA, ASSIGNOR TO SHAWINIGAN LABORATORIES, LIMITED, OF MONTREAL, QUEBEC, CANADA.

MANUFACTURE OF ALDEHYDE-AMMONIA.

No Drawing.     Application filed October 18, 1919. Serial No. 331,657.

*To all whom it may concern:*

Be it known that I, HOWARD W. MATHESON, a subject of the King of Great Britain, and resident of the city of Montreal, in the Province of Quebec and Dominion of Canada, have invented certain new and useful Improvements in Manufacture of Aldehyde-Ammonia, of which the following is a full, clear, and exact description.

This invention relates to improvements in the manufacture of aldehyde-ammonia and the object of the invention is to produce aldehyde-ammonia of great purity in an expeditious and inexpensive manner.

According to the present invention aldehyde vapor and ammonia in gaseous form are brought together in a suitable reaction vessel. A reaction takes place with the evolution of considerable heat. Solid aldehyde-ammonia is deposited within the vessel in the form of a white crust.

An excess of ammonia should be present in the vessel at all times and the walls of the vessel must be cooled to keep the temperature below the point at which resinification of the aldehyde occurs in presence of ammonia and which is indicated by appearance of a yellow coloration in the product. The aldehyde-ammonia should be continuously removed from the vessel to prevent the accumulation of sufficient material to interfere with abstraction of the heat.

Liquid ammonia may be vaporized directly in the reaction vessel and the aldehyde vapor passed in at a suitable rate. The vaporization of ammonia will absorb a part of the heat of the reaction and will thus assist in keeping down the temperature.

It is not necessary to have the bottom of the reaction vessel completely sealed as the reaction takes place quite readily at atmospheric pressure. The reaction will also occur at ordinary temperatures. While the reaction will take place at ordinary temperatures and at atmospheric pressure it must be understood that the invention is not limited to these but includes the reaction at any desired combination of temperature and pressure.

The following example will serve to illustrate in greater detail the carrying out of the process;—Acetaldehyde is vaporized in a suitable boiler heated by steam or other means and passed into the top of a vertical tube through which a stream of dry ammonia gas is flowing. The relative proportions of the gases can be adjusted by means of Venturi meters, the ammonia gas being always in excess of the aldehyde. The gases combine, with the evolution of considerable heat, according to the equation $NH_3 + CH_3CHO = CH_3CH(OH)NH_2$. Water is allowed to flow over the outside of the tube to absorb the heat of the reaction. The aldehyde-ammonia is deposited in the form of a white crust on the walls of the vessel and is removed by scraping the walls and, if necessary, suitably agitating the vessel.

The precise means for removing the aldehyde-ammonia from the vessel is of no consequence to the present invention as in various types of apparatus special provision may be made for the purpose. The product is obtained in a very pure state.

The ammonia gas may be in excess of the combinable amount and the excess removed continuously and returned into the reaction together with a fresh gas.

While the only method of removing the aldehyde-ammonia that has been referred to is scraping the walls of the reaction vessel, it will be understood that the walls referred to are not necessarily the confining walls of the vessel but may be special depositing surfaces removable from the vessel. It must also be understood that the phrase "continuously removing" the produced aldehyde-ammonia does not mean that the removal must be carried on absolutely without interruption but must be interpreted merely as meaning that the product is removed in a regular manner so that there is no great accumulation thereof which would reduce the volume of the reaction vessel relative to the volume of in-flowing gases or which would interfere with the abstraction of the heat of reaction.

The advantage of this process is the production of a purer, whiter product than can be obtained in previously known process. The elimination of solvents from the process ensures against any unrecovered solvents remaining in the product as impurities.

Having thus described my invention, what I claim is;—

1. A process for the manufacture of aldehyde-ammonia comprising bringing together acetaldehyde vapor and gaseous ammonia.

2. A process according to claim 1, in which the ammonia is in excess of one molecular equivalent of ammonia to each molecular equivalent of the acetaldehyde.

3. In combination with a process according to claim 1, the additional step of absorbing sufficient of the heat of reaction to keep the acetaldehyde below the temperature at which resinification takes place in presence of ammonia.

4. In combination with a process according to claim 1, the additional step of removing, during the reaction, the aldehyde-ammonia deposited within the vessel.

5. A process according to claim 1, in which liquid ammonia is vaporized within the reaction vessel.

6. In combination with a process according to claim 1, the step of absorbing the heat of reaction partly by external cooling of the reaction vessel and partly by utilizing the heat to vaporize liquid ammonia within the vessel.

7. A process for the manufacture of aldehyde-ammonia which comprises bringing together acetaldehyde vapor and gaseous ammonia in proximity to a surface upon which the produced aldehyde-ammonia will be deposited.

8. A process according to claim 7, in which the deposit receiving surface is cooled by passage of a fluid capable of absorbing heat.

9. A process according to claim 7, in which the aldehyde-ammonia deposit is removed from the zone of the reaction and an unimpaired depositing surface presented.

10. A process according to claim 7, in which the temperature is maintained below the point of resinification of the acetaldehyde in presence of ammonia by passing a heat absorbing medium in contact with the deposit receiving element.

In witness whereof, I have hereunto set my hand.

HOWARD W. MATHESON.